July 24, 1962 A. BELLOMO 3,045,456
HOMOKINETIC UNIVERSAL JOINT
Filed March 30, 1960
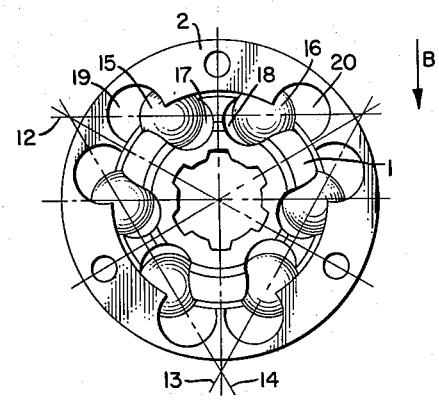
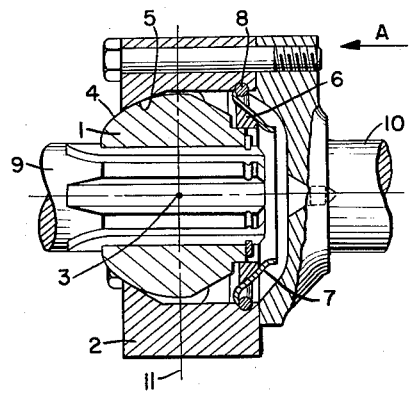
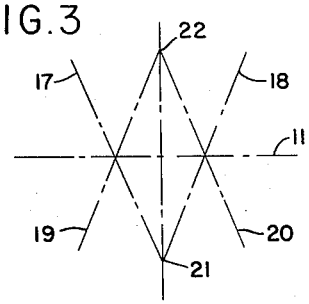
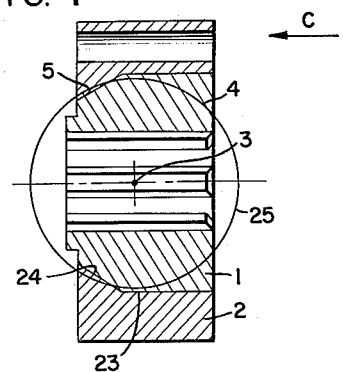
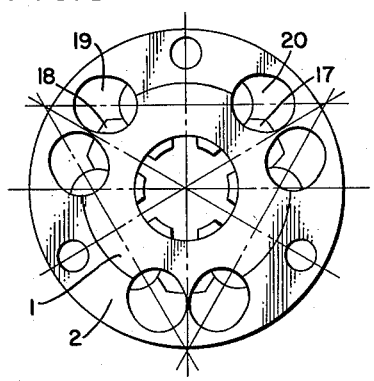
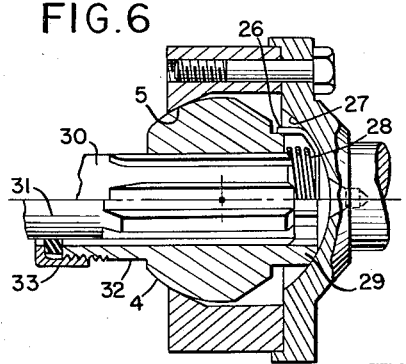
INVENTOR
ANDREA BELLOMO
BY Olson + Trexler
ATTORNEYS 3,045,456
HOMOKINETIC UNIVERSAL JOINT
Andrea Bellomo, Turin, Italy
Filed Mar. 30, 1960, Ser. No. 18,527
11 Claims. (Cl. 64—21)

The present invention relates to improvements in homokinetic universal joints for the transmission of power between angularly shifted shafts, of the type in which the transmission between a male element or inner race and a female element or outer race is performed by a plurality of balls, each of which is engaged by a groove of the inner race and by a groove of the outer race, which two grooves cross each other symmetrically on the bisecting plane of the angle between the geometric axes of the shafts connected by the joint, the driving balls being maintained on said bisecting plane by the crossing of the grooves without the aid of other guiding means such as cages or the like. The grooves generally are straight and of circular section.

The invention refers to means to prevent axial displacements between the inner race and the outer race, without preventing relative angular displacements therebetween, and concerns the shaping of the two elements in view of machining the grooves of the driving balls by drilling and boring simultaneously the inner race and the outer race which are coupled in a relative position overturned with respect to the position of operative assembling, as claimed in U.S.A. application No. 582,506 filed on May 3, 1956, now Patent No. 3,002,364.

The invention is illustrated by way of example only, without any limitation, in the accompanying drawing in which:

FIGURE 1 is a longitudinal section of a joint according to the present invention;

FIGURE 2 is a view according to arrow A of the inner race 1 and the outer race 2 of FIGURE 1 with the balls introduced into the crossings of the grooves;

FIGURE 3 shows, according to arrow B, the geometrical axes of grooves 17, 18, 19 and 20 all lying on plane 12 which is orthogonal to the plane of the drawing of FIG. 2;

FIGURE 4 is a longitudinal section of the inner race 1 and the outer race 2, both incompletely machined on the outer surface and on the inner surface, respectively, and coupled in a relative position overturned with respect to the operative assembled position as shown in FIG. 1;

FIGURE 5 is a view, according to arrow C, of the elements 1 and 2 of FIGURE 4 and shows the grooves machined on the two elements coupled in said overturned position;

FIGURE 6 is a longitudinal section of a few modifications of certain details, with respect to the embodiment of FIG. 1.

According to a feature of the invention, the joint in FIGURE 1 may angularly shift around the pivot centre 3, which is the intersection of plane 11, containing the centres of the driving balls, with the geometrical axes of shafts 9 and 10 connected by the joint, the inner race being prevented from axial displacement with respect to the outer race 2, towards the left by the co-acting spherical rims 4 and 5 provided on the inner race and in the outer race, respectively, and towards the right by the spherical cup 7, which is retained in the outer race 2 by means of a ring or spring clip 8 provided in a circular seat of the outer race.

Another feature consists in that in FIGURE 1, between the inner race 1 and the cup 7, there is introduced a thrust ring 6 provided with a spherical or simply conical rim co-acting with the spherical concave rim of cup 7. Furthermore, both in the co-acting spherical rims 4 and 5 of the inner race and of the outer race and in the co-acting surfaces of ring 6 and cup 7 the spherical centre is coincident with the pivot centre 3, so that the inner race is able to angularly shift with respect to the outer race in every direction. In order to avoid a too accurate machining, it is possible to provide between the parts described an axial clearance, as shown between ring 6 and its seat on the inner race. However, in certain special applications this axial clearance is to be maintained within narrow limits and in these cases the spherical surfaces disclosed have to be exactly concentric in 3, that is to say, with the pivot centre determined by the driving balls. An advantage of the embodiment as shown in FIGURE 1 resides in that the ring 8, by retaining cup 7, prevents the joint, if it is not connected to the shafts, from undesirable disassembling. Since, during the operation, the ring 8 has to bear axial thrusts, it may be retained on its seat by a border of the flange connected to the outer race as shown in FIGURE 1 in the upper semisection.

FIGURE 6 shows a few modifications with respect to FIGURE 1. In effect, there is omitted cup 7 and its function is performed by the spherical seat 27 provided in the flange connected to the outer race. Moreover, in the upper semisection FIGURE 6 shows a spring 28 intended to take up again, if necessary, the aforesaid axial clearance, by pushing ring 26 against the surface 27 and by pushing at the same time the spherical rim 4 of the inner race against the spherical rim 5 of the outer race. Furthermore, the same upper semisection shows a splined shaft 30 floating in the inner race such as may be required to correct, when assembling, the length of the shaft. In the lower semisection FIGURE 6 shows, instead, an arrangement adapted to cause the splined shaft 31 in the inner race to slide under load, the inner race being provided with an extension 32 and with sealing means 33 for the lubricant. Moreover, the same lower semisection shows the lug 29 of the inner race, in substitution of ring 6 or 26.

The construction disclosed of the joint, as shown in FIGURES 1 and 6, permits mounting the joint in a simple manner by introducing the inner race into the outer race through axial displacement and by inserting at the same time the balls into the respective couples of grooves. At the most, the introduction of the last two or three balls may require a slight relative angular movement between the two elements.

Said construction permits also to introduce, through axial displacement, the inner race into the outer race even in an overturned position with respect to the operative assembled position as shown in FIG. 4, for the purpose of common machining of the grooves on the two elements as shown in FIG. 5. It is even possible to couple the two elements, for the common machining of the grooves prior to completing the turning machining, so that the inner race completely or nearly completely fills up the outer race, as shown in FIGURES 4 and 5, for the purpose of assuring that the tools intended to drill and to ream the grooves act upon the full metal, namely in the best technological conditions. To this end, on the elements 1 and 2 in FIGURES 4 and 5 there have not yet been machined on the two elements the respective spherical rims 4 and 5 illustrated in FIGURE 1, and the two elements match along the cylindrical surface 23, which has a greater diameter than sphere 25, and they match also along the conical surface 24, or along any other form of contraction entering the sphere 25, whose surface coincides with the surfaces 4 and 5, to be provided subsequently, and whose centre coincides with 3, which will be the pivot centre of the joint mounted to be employed as in FIG. 1.

Upon having bored the grooves as in FIGURE 5, there is started the machining of the spherical rim 4 on the cylindrical section of the inner race 1 and the machining of the spherical rim 5 on the contracted section of the inner surface of the outer race 2. Of course, said spherical surfaces are interrupted by the grooves of the balls.

Obviously, nothing prevents the grooves from being machined as in FIGURE 5, after having provided said spherical surfaces 4 and 5 on the inner race and in the outer race by a machining operation, by making use of special tools for drilling and finishing the grooves, which in this case are holes with discontinued walls. This eventuality will occur in any case if it is desired to grind the grooves after the final heat treatment of the two elements. However, generally grinding is unnecessary since by the machining of the grooves in the manner described a great accurateness is achieved.

The machining of the grooves as in FIGURE 5 requires that the geometric axes of said grooves coincide if the inner race in the outer race is overturned with respect to the operative assembled position, just as shown in FIGURE 5 and as claimed in the above-mentioned previous invention.

In FIGURES 2, 3, and 5 there is illustrated a six ball joint with an arrangement of the geometric axes of the grooves which suits this purpose. In FIGURE 2, with aligned shafts, on each of the planes, 12, 13 and 14, which are orthogonal to the plane of the drawing, there lie the geometric axes of the four grooves relating to a couple of adjacent balls such as, for example, on plane 12 the axes of grooves 17 and 18 of the inner race and the axes of grooves 19 and 20 of the outer race, which four grooves engage balls 15 and 16. As shown in FIGURE 3, in plane 12 the axes of grooves 17 and 18 of the inner race converge in a point 21 and the axes of the corresponding grooves 19 and 20 of the outer race converge in a point 22 symmetric to 21 with respect to plane 11 containing the centres of the balls. Upon having overturned the inner race, as in FIGURE 5, the vertexes 21 and 22 coincide between each other and the grooves 17 and 20 of the inner race and of the outer race, respectively, may be machined simultaneously in the same way as a simple cylindrical hole, and this applies also to the couple of grooves 18 and 19 and to other similar couples.

Another feature of the invention consists in that a universal joint with a fixed pivot centre, according to the present invention, and a joint capable of angularly shifting and of axially sliding, according to said previous invention, both connected through a shaft, form a basic complex which permits a considerable number of applications and particularly applications to motor cars.

As compared with the known art, the invention refers to a universal joint which is simple and economical owing to the following characteristics:

It does not require cages or other means to guide the driving balls;

The grooves of the driving balls are machined simultaneously on the two elements, so as to save cost and to improve accurateness;

Except for special applications, no particular accurateness is required between the various parts of the joint, which means a further saving in the cost;

Assembling and disassembling may be performed in a simple and quick manner.

What I claim is:

1. A homokinetic universal joint, comprising an inner race, an outer race and a plurality of driving balls, each of which is engaged and guided, without the aid of cages or similar means, by two crossed grooves, one groove on the inner race and another groove on the outer race, characterized in that one end of the outer race comprises a contracted area of the inner surface in which there is provided a spherical rim to retain the inner race in an axial direction, and the other end of the outer race is provided with a spherical cup which reduces the opening of the outer race in order to retain the inner race in the opposite axial direction.

2. A homokinetic universal joint according to claim 1, characterized in that the spherical cup at one end of the outer race is retained in the outer race by ring means located in a circular seat provided in the outer race.

3. A homokinetic universal joint according to claim 1, characterized in that the spherical cup, at one end of the outer race, is retained by a flange on the shaft connected to the outer race.

4. A homokinetic universal joint according to claim 3, characterized in that the spherical cup, at one end of the outer race, is formed by the said flange of the shaft connected to the outer race.

5. A homokinetic universal joint according to claim 1, characterized in that between the inner race and the spherical cup located at one end of the outer race there is provided a thrust ring coacting with said spherical cup.

6. A homokinetic universal joint according to claim 1, characterized in that it comprises resilient means to take up again the axial clearance of the inner race between the spherical cup connected to one end of the outer race and the spherical rim provided in the outer race at the opposite end.

7. A homokinetic universal joint according to claim 1, characterized in that the inner surface of the outer race has a diameter decreasing from one end to the other end and, in every section, it has a diameter equal to or greater than the corresponding diameter of the inner race introduced into the outer race in a position overturned by 180° with respect to the position of operative assembly.

8. A homokinetic universal joint according to claim 1, characterized in that the inner surface of the outer race, which is interrupted by the grooves of the driving balls, is cylindrical with a contracted terminal section, in which there is provided the spherical rim which retains the inner race in an axial direction, whereas the outer surface of the inner race is spherical with a contracted terminal section, which in position of operative assembly is at the opposite end with respect to the contracted section of the inner surface of the outer race.

9. A homokinetic universal joint according to claim 1, characterized in that the geometrical axes of the grooves of the inner race coincide with the geometrical axes of the grooves of the outer race if the inner race is introduced into the outer race in a position overturned with respect to the position of operative assembly.

10. A homokinetic universal joint according to claim 1, characterized in that the inner race is connected to the respective shaft by means of a sliding splined coupling, and sealing means for the lubricant to permit sliding under load between the shaft and the inner race.

11. A homokinetic universal joint according to claim 1, characterized in that it comprises an inner race, an outer race and means to retain the inner race within said outer race, without preventing relative angular displacements therebetween, and a plurality of driving balls guided by crossed grooves of the inner race and of the outer race, the geometrical axes of the grooves of the two races being able to coincide if the inner race is introduced into the outer race in a position overturned with respect to the position of operative assembly.

References Cited in the file of this patent

UNITED STATES PATENTS

| | | |
|---|---|---|
| 2,006,026 | Midthun | June 25, 1935 |
| 2,321,448 | Anderson | June 8, 1943 |
| 2,579,356 | Anderson | Dec. 18, 1951 |

FOREIGN PATENTS

| | | |
|---|---|---|
| 637,780 | Great Britain | May 24, 1950 |